(12) United States Patent
Ueki et al.

(10) Patent No.: US 10,788,093 B2
(45) Date of Patent: Sep. 29, 2020

(54) VIBRATION-DAMPING DEVICE

(71) Applicant: BRIDGESTONE CORPORATION, Tokyo (JP)

(72) Inventors: Akira Ueki, Tokyo (JP); Yuki Satake, Tokyo (JP); Masakazu Nagasawa, Tokyo (JP); Yasuyuki Nagashima, Tokyo (JP); Hideki Sugawara, Tokyo (JP); Shingo Oono, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 6 days.

(21) Appl. No.: 16/099,572

(22) PCT Filed: Jun. 16, 2017

(86) PCT No.: PCT/JP2017/022266
§ 371 (c)(1),
(2) Date: Nov. 7, 2018

(87) PCT Pub. No.: WO2017/221823
PCT Pub. Date: Dec. 28, 2017

(65) Prior Publication Data
US 2019/0145488 A1 May 16, 2019

(30) Foreign Application Priority Data

Jun. 23, 2016 (JP) .................................. 2016-124914

(51) Int. Cl.
*F16F 13/10* (2006.01)
(52) U.S. Cl.
CPC ............ *F16F 13/107* (2013.01); *F16F 13/10* (2013.01)
(58) Field of Classification Search
CPC .......... F16F 13/107; F16F 13/10; F16F 13/08; B60K 5/1208; B60K 5/12
(Continued)

(56) References Cited

U.S. PATENT DOCUMENTS 4,773,634 A * 9/1988 Hamaekers ........... F16F 13/106
137/493
4,928,935 A * 5/1990 Matsui .................... F16F 13/30
267/140.13
(Continued)

FOREIGN PATENT DOCUMENTS

CN 101896733 A 11/2010
CN 104508318 A 4/2015
(Continued)

OTHER PUBLICATIONS

International Search Report for PCT/JP2017/022266 dated Aug. 8, 2017 [PCT/ISA/210].
(Continued)

*Primary Examiner* — Pamela Rodriguez
(74) *Attorney, Agent, or Firm* — Sughrue Mion, PLLC

(57) ABSTRACT

A vibration-damping device (10) of the present invention includes a first attachment member (11), a second attachment member (12), an elastic body (13), and a partition member (16). In the partition member, a restriction passage (24) through which the first liquid chamber (14) and the second liquid chamber (15) communicate with each other is formed. The restriction passage includes a first communicating portion (26) which opens to the first liquid chamber, a second communicating portion (27) which opens to the second liquid chamber, and a main body flow passage (25) through which the first communicating portion and the second communicating portion communicate with each other. At least one of the first communicating portion and the second communicating portion includes a plurality of fine holes (26a) which are disposed in a flow passage direction of the main body flow passage. A ratio of a projected area or an opening area of a smallest cross section of the fine holes, which occupies per a predetermined area of the first barrier or the second barrier, gradually decreases as it separates (Continued)

from the other of the first communicating portion and the second communicating portion in the flow passage direction.

12 Claims, 3 Drawing Sheets

(58) Field of Classification Search
USPC .......................... 248/560, 562, 566, 636, 638
See application file for complete search history.

(56) References Cited

U.S. PATENT DOCUMENTS

| | | | | |
|---|---|---|---|---|
| 5,094,433 | A | * | 3/1992 | Dan ...................... F16F 13/105 138/30 |
| 5,853,063 | A | * | 12/1998 | Meyerink ............. F16F 13/106 267/140.13 |
| 9,772,002 | B2 | * | 9/2017 | Ueki ..................... B60K 5/1208 |
| 2010/0270716 | A1 | | 10/2010 | Ueki et al. |
| 2015/0184717 | A1 | | 7/2015 | Kojima |
| 2016/0053844 | A1 | * | 2/2016 | Nagasawa ............. B60K 5/1208 267/140.13 |
| 2016/0053845 | A1 | * | 2/2016 | Ueki ..................... B60K 5/1208 267/140.13 |

FOREIGN PATENT DOCUMENTS

| | | |
|---|---|---|
| JP | 62-224749 A | 10/1987 |
| JP | 2007-182930 A | 7/2007 |
| JP | 2012-172832 A | 9/2012 |
| WO | 2016/027606 A1 | 2/2016 |

OTHER PUBLICATIONS

Search Report dated Dec. 9, 2019 from the State Intellectual Property Office of the P.R.C. In application No. 2017800381965.

\* cited by examiner

VIBRATION-DAMPING DEVICE

TECHNICAL FIELD

The present invention relates to a vibration-damping device which is applied to, for example, automobiles, industrial machinery and the like to absorb and attenuate vibration of a vibration-generating part such as an engine.

This application is a National Stage of International Application No. PCT/JP2017/022266, filed on Jun. 16, 2017, which claims priority from Japanese Patent Application No. 2016-124914, filed Jun. 23, 2016, the content of which is incorporated herein by reference.

BACKGROUND ART

As a vibration-damping device of this type, in the related art, a configuration is known including a tubular first attachment member connected to one of a vibration occurrence part and a vibration reception part, a second attachment member connected to the other thereof, an elastic body for connecting both attachment members, and a partition member for partitioning a liquid chamber in the first attachment member with liquid sealed therein into a primary liquid chamber and an auxiliary liquid chamber. In the partition member, a restriction passage is formed through which the primary liquid chamber and the auxiliary liquid chamber communicate with each other. In the vibration-damping device, at the time of vibration input, both attachment members are displaced relative to each other, while elastically deforming the elastic body, and a liquid pressure in the primary liquid chamber varies to cause the liquid to flow through the restriction passage, thereby absorbing and attenuating the vibration.

In the vibration-damping device, for example, when a large load (vibration) is input due to unevenness or the like of a road surface, the liquid pressure of the primary liquid chamber suddenly rises, and then a load is input in a reverse direction due to the rebound of the elastic body or the like, the primary liquid chamber may suddenly have a negative pressure. Then, a cavitation in which a large number of air bubbles are generated in the liquid due to the sudden negative pressure occurs, and in some cases, an abnormal sound may occur due to cavitation collapse in which the generated air bubbles collapse.

Thus, for example, as in the vibration-damping device disclosed in the following Patent Document 1, a configuration is known in which a negative pressure in the primary fluid chamber is curbed, even when vibrations of a large amplitude are input, by providing a valve body in the restriction passage.

CITATION LIST

Patent Document

[Patent Document 1]
Japanese Unexamined Patent Application, First Publication No. 2012-172832

SUMMARY OF INVENTION

Technical Problem

However, in the vibration-damping device of the related art, since the structure becomes complicated due to providing the valve body and tuning of the valve body is also required, there is a problem in that the manufacturing cost increases. Also, the degree of freedom in designing is lowered due to providing the valve body, and as a result, there is a possibility that the vibration-damping characteristics will be lowered.

The present invention has been made in view of the above circumstances, and an object of the present invention is to provide a vibration-damping device capable of curbing the occurrence of abnormal sound due to cavitation collapse with a simple structure, without vibration-damping characteristics deteriorating.

Solution to Problem

The liquid-sealed type vibration-damping device of the present invention includes a tubular first attachment member connected to one of a vibration occurrence part and a vibration reception part, and a second attachment member connected to the other; an elastic body which elastically connects both attachment members; and a partition member which partitions a liquid chamber in the first attachment member in which liquid is sealed into a first liquid chamber and a second liquid chamber, a restriction passage through which the first liquid chamber and the second liquid chamber communicate with each other formed in the partition member, wherein the restriction passage includes a first communicating portion which is formed on a first barrier facing the first liquid chamber and opens to the first liquid chamber, a second communicating portion which is formed on a second barrier facing the second liquid chamber and opens to the second liquid chamber, and a main body flow passage through which the first communicating portion and the second communicating portion communicate with each other, at least one of the first communicating portion and the second communicating portion includes a plurality of fine holes which penetrate through the first barrier or the second barrier and are disposed in a flow passage direction of the main body flow passage, and a proportion that a projected area or an opening area of a smallest cross section of the plurality of fine holes occupies per a predetermined area of the first barrier or the second barrier gradually decreases as it separates from the other of the first communicating portion and the second communicating portion in the flow passage direction.

Effects of Invention

According to the present invention, it is possible to provide to a vibration-damping device capable of suppressing the occurrence of abnormal sound due to cavitation collapse with a simple structure, without deteriorating vibration-damping characteristics.

DESCRIPTION OF EMBODIMENTS

First Embodiment

Hereinafter, embodiments of the vibration-damping device according to the present invention will be described with reference to FIGS. 1 and 2.

Figure 1:
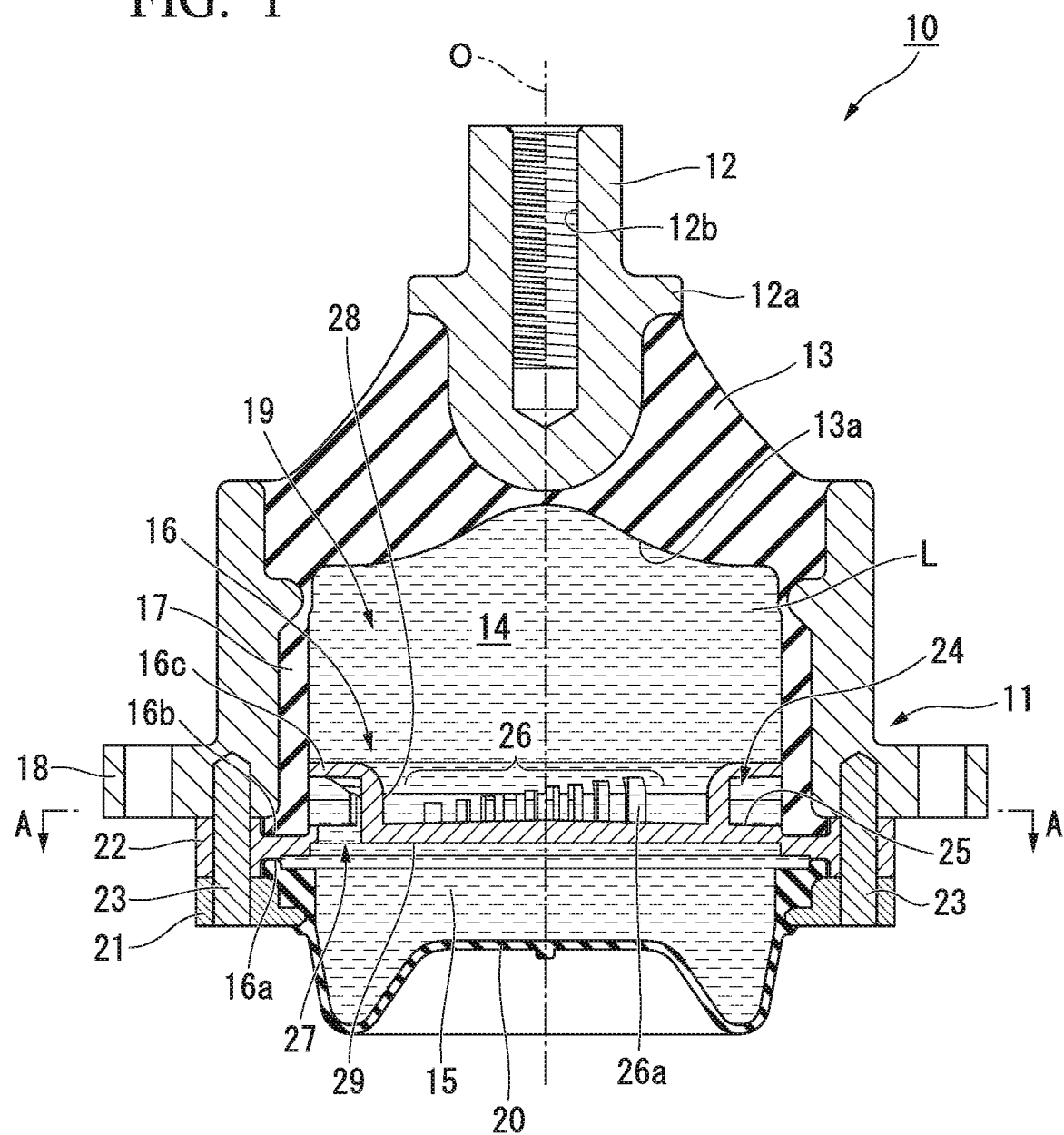
FIG. 1 is a longitudinal sectional view of a vibration-damping device according to an embodiment of the present invention.

As illustrated in FIG. 1, a vibration-damping device 10 is a liquid-sealed type vibration-damping device which includes a tubular first attachment member 11 connected to one of a vibration occurrence part and a vibration reception part, a second attachment member 12 connected to the other of the vibration occurrence part and the vibration reception part, an elastic body 13 which elastically connects the first attachment member 11 and the second attachment member 12 to each other, and a partition member 16 which partitions the interior of the first attachment member 11 into a primary liquid chamber 14 and an auxiliary liquid chamber 15 to be described later.

Hereinafter, a central shaft line of the first attachment member 11 is referred to as a central axis O, and a direction along the central axis O is referred to as an axial direction. Further, a second attachment member 12 side in the axial direction is referred to as an upper side, and the partition member 16 side is referred to as a lower side. Also, in plan view of the vibration-damping device 10 viewed from the axial direction, a direction orthogonal to the axial center O is referred to as a "radial direction", and a direction of circumferential rotation around the axial center O is referred to as a "circumferential direction".

Each of the first attachment member 11, the second attachment member 12, and the elastic body 13 is formed in a circular or annular shape in plan view, and is disposed coaxially with the axial center O.

When the vibration-damping device 10 is attached to, for example, an automobile, the second attachment member 12 is connected to an engine as a vibration occurrence part, and the first attachment member 11 is connected to a vehicle body as a vibration reception part. As a result, transfer of vibration of the engine to the vehicle body is suppressed.

The second attachment member 12 is a columnar member extending in the axial direction, a lower end portion thereof is formed in a hemispherical shape, and a flange portion 12a is provided above the lower end portion of the hemispherical shape. A screw hole 12b extending downward from an upper end surface of the second attachment member 12 is formed in an upper part of the second attachment member 12, and a bolt (not illustrated) serving as an attachment tool of the engine side is screwed into the screw hole 12b. Further, the second attachment member 12 is disposed on an upper end opening side of the first attachment member 11 via the elastic body 13.

The elastic body 13 is a vulcanized rubber body bonded to each of an upper end opening portion of the first attachment member 11 and a lower end side outer circumferential surface of the second attachment member 12 and is interposed therebetween, and the elastic body 13 closes the upper end opening portion of the first attachment member 11 from the upper side. When an upper end portion of the elastic body 13 abuts against the flange portion 12a of the second attachment member 12, the elastic body 13 is brought into sufficiently close contact with the second attachment member 12 such that it more favorably conforms to the displacement of the second attachment member 12. In addition, a rubber film 17 which liquid-tightly covers the inner circumferential surface of the first attachment member 11 and a part of the lower end opening edge is integrally formed at the lower end portion of the elastic body 13. As the elastic body 13, it is also possible to use an elastic body made of synthetic resin or the like in addition to rubber.

The first attachment member 11 is formed in a cylindrical shape having a flange 18 at a lower end portion thereof, and is connected to a vehicle body or the like as a vibration reception part via the flange 18. A portion of the interior of the first attachment member 11 located below the elastic body 13 is a liquid chamber 19. In the present embodiment, the partition member 16 is provided inside the lower end portion of the first attachment member 11, and a diaphragm 20 is provided below the partition member 16.

The diaphragm 20 is made of an elastic material such as rubber or soft resin, and is formed into a bottomed cylindrical shape. An upper end portion of the diaphragm 20 is sandwiched in the axial direction by the partition member 16 and a ring-shaped retainer 21 located below the partition member 16. On a lower surface of the partition member 16, an annular attachment groove 16a with which the upper end portion of the diaphragm 20 is liquid-tightly engaged is formed. A lower flange portion 22 is formed on the outer periphery of the partition member 16, and the upper surface of the retainer 21 abuts against the lower surface of the lower flange portion 22.

With such a configuration, at a lower end opening edge of the first attachment member 11, the lower flange portion 22 of the partition member 16 and the retainer 21 are disposed downward in this order and are fixed by the screws 23. Thus, the diaphragm 20 is attached to the lower end opening portion of the first attachment member 11 via the partition member 16. Further, in this embodiment, a bottom portion of the diaphragm 20 has a shape which is deep at the outer circumferential side and shallow at the central portion. However, for the shape of the diaphragm 20, in addition to such a shape, shapes of various conventionally known types can be adopted.

Further, as described above, since the diaphragm 20 is attached to the first attachment member 11 via the partition member 16, the liquid chamber 19 is formed in the first attachment member 11 as described above. Since the liquid chamber 19 is disposed inside the first attachment member 11, that is, on the inner side of the first attachment member 11 in plan view, the liquid chamber 19 is a sealed space liquid-tightly sealed by the elastic body 13 and the diaphragm 20. The liquid L is sealed (filled) into this liquid chamber 19.

The liquid chamber 19 is partitioned into a primary liquid chamber 14 and an auxiliary liquid chamber 15 by the partition member 16. The primary fluid chamber 14 is formed with the lower surface 13a of the elastic body 13 as a part of the wall surface, and is a space surrounded by the elastic body 13, the rubber film 17 which liquid-tightly covers the inner circumferential surface of the first attachment member 11 and the partition member 16. An internal volume of the primary fluid chamber 14 changes by the deformation of the elastic body 13. The auxiliary liquid chamber 15 is a space surrounded by the diaphragm 20 and the partition member 16, and an internal volume of the auxiliary liquid chamber 15 changes by deformation of the diaphragm 20. The vibration-damping device 10 having such a configuration is a compression type device that is used by being attached so that the primary liquid chamber 14 is located on the upper side in the vertical direction and the auxiliary liquid chamber 15 is located on the lower side in the vertical direction.

In a portion of the upper surface of the partition member 16 continuing to the inner circumferential edge of the lower flange portion 22, a holding groove 16b for holding the lower end portion of the rubber film 17 in a liquid-tight manner is formed. Further, an annular upper flange portion 16c having an outer circumferential surface liquid-tightly abutting against the inner circumferential surface of the rubber film 17 is formed at the upper end portion of the partition member 16. The space between the rubber film 17 and the partition member 16 is liquid-tightly closed by the holding groove 16b and the upper flange portion 16c.

In addition, the partition member 16 is provided with a restriction passage 24 through which the primary liquid chamber 14 and the auxiliary liquid chamber 15 communicate with each other.

Figure 2:
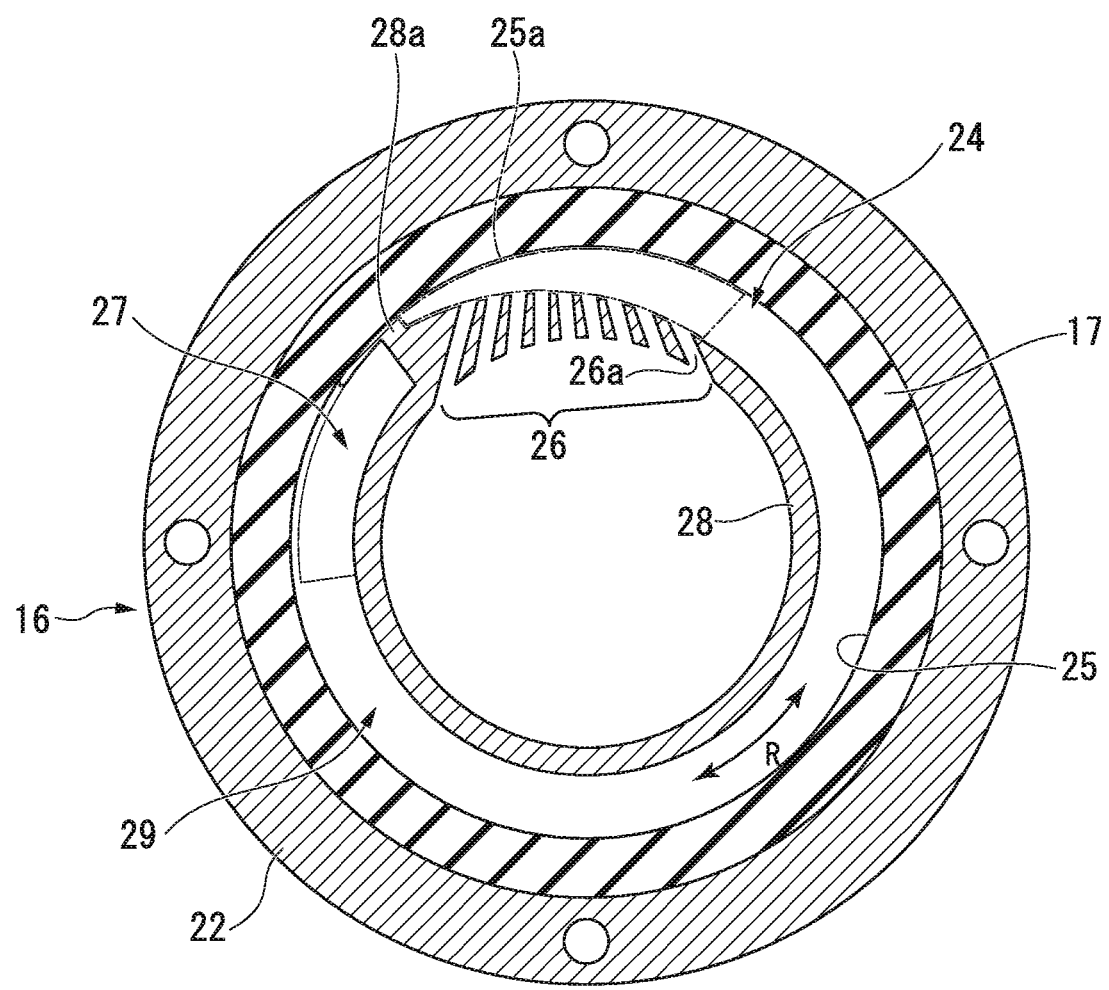
FIG. 2 is a cross-sectional view of a partition member and an elastic body illustrated in FIG. 1 taken along a line A-A.

As illustrated in FIGS. 1 and 2, the restriction passage 24 includes a main body flow passage 25 disposed in the partition member 16, a first communicating portion 26 through which the main body flow passage 25 and the primary liquid chamber 14 communicate with each other, and a second communicating portion 27 through which the main body flow passage 25 and the auxiliary liquid chamber 15 communicate with each other.

The main body flow passage 25 extends in the circumferential direction within the partition member 16, and the flow passage direction R of the main body flow passage 25 is the same direction as the circumferential direction. The main body flow passage 25 is formed in a circular arc shape disposed coaxially with the axial center O and extends over substantially the entire circumference in the circumferential direction. Both end portions along the circumferential direction of the main body flow passage 25 are separated from each other by partition walls 28a extending in the radial direction and the axial direction.

The main body flow passage 25 is defined by a first barrier 28 facing the primary liquid chamber 14, a second barrier 29 facing the auxiliary liquid chamber 15, an upper flange portion 16c, a rubber film 17, and a partition wall 28a. Further, the first barrier 28 and the second barrier 29 may not define the main body flow passage 25.

The first barrier 28 is formed in a cylindrical shape extending downward from the inner circumferential edge of the upper flange portion 16c. As illustrated in FIG. 2, the portion of the outer circumferential surface of the first barrier 28 on which the first communicating portion 26 is disposed gradually faces outward in the radial direction as it separates from the second communicating portion 27 in the flow passage direction R. Therefore, a flow passage area of the main body flow passage 25 at the connecting portion 25a with the first communicating portion 26 gradually decreases as it separates from the second communicating portion 27 in the flow passage direction R.

The second barrier 29 is formed in a plate shape in which front and back surfaces face the axial direction. The upper surface of the second barrier 29 and the lower end of the first barrier 28 are continuous with each other. The first barrier 28 is sandwiched between the main body flow passage 25 and the primary liquid chamber 14 in the radial direction, and is located between the main body flow passage 25 and the primary liquid chamber 14. The second barrier 29 is axially sandwiched between the main body flow passage 25 and the auxiliary liquid chamber 15, and is located between the main body flow passage 25 and the auxiliary liquid chamber 15.

The first communicating portion 26 penetrates through the first barrier 28 in the radial direction, and has a plurality of fine holes 26a disposed in the flow passage direction R. The plurality of fine holes 26a are disposed in a portion of the first barrier 28 that forms an end portion on one side of the main body flow passage 25 in the circumferential direction.

The second communicating portion 27 is an opening that penetrates the second barrier 29 in the axial direction. The second communicating portion 27 is disposed in a portion of the second barrier 29 that forms the other end portion of the main body flow passage 25 in the circumferential direction.

Each of the plurality of fine holes 26a is formed in a rectangular parallelepiped shape. Each of the opening portions of the plurality of fine holes 26a facing the primary liquid chamber 14 is formed in a rectangular shape that is longer in the axial direction than in the circumferential direction in a front view viewed from the inner side in the radial direction. A flow passage cross-sectional area of the plurality of fine holes 26a is equal over the entire length of the flow passage length of each fine hole 26a. The circumferential widths of the plurality of fine holes 26a are equal to each other. The plurality of fine holes 26a are disposed with equal intervals therebetween in the circumferential direction.

In addition, an axial length of the plurality of fine holes 26a decreases as the fine holes become located further away as it separates from the second communicating portion 27 in the flow passage direction R. Therefore, as the plurality of fine holes 26a become located further apart as it separates from the second communicating portion 27 in the flow passage direction R, a projected area or an opening area of the smallest cross-section becomes smaller. As a result, a ratio of the projected area or the opening area of the smallest cross section of the fine hole 26a, which occupies per a predetermined area on the inner circumferential surface of the first barrier 28 facing the primary liquid chamber 14, gradually decreases as it separates from the second communicating portion 27 in the flow passage direction R.

In addition, as the plurality of fine holes 26a are located apart as it separates from the second communicating portion 27 in the flow passage direction R, the flow passage length thereof increases.

As described above, as the plurality of fine holes 26a are located apart as it separates from the second communicating portion 27 in the flow passage direction R, the resistance when the liquid L flows through the fine holes 26a increases.

The term "projected area" refers to a projected area oriented in a direction in which a fine hole center line passing through the center of the smallest cross section of the fine hole 26a extends to the surface located in the primary liquid chamber 14 or the auxiliary liquid chamber 15 in the first barrier 28 or the second barrier 29.

In the vibration-damping device 10 having such a configuration, at the time of vibration input, both attachment members 11 and 12 are relatively displaced, while elastically deforming the elastic body 13. Then, the liquid pressure of the primary liquid chamber 14 fluctuates, the liquid L in the primary liquid chamber 14 flows into the auxiliary liquid chamber 15 through the restriction passage 24, and the liquid L in the auxiliary liquid chamber 15 flows into the primary liquid chamber 14 through the restriction passage 24. That is, a part of the liquid L in the auxiliary liquid chamber 15 returns to the primary liquid chamber 14. At this time, for example, as the primary liquid chamber 14 has a negative pressure, a part of the liquid L is evaporated to generate air bubbles, and cavitation collapse occurs. Alternatively, after the flow of the liquid L flowing through the main body flow passage 25 toward the first communicating portion 26 passes through the plurality of fine holes 26a by inertia, the flow collides with the partition wall 28a and flows into the primary liquid chamber 14 by being biased from the fine hole located closer to the partition wall 28a among the plurality of fine holes 26a. Thus, in some cases, the flow velocity of the liquid L having passed through the plurality of fine holes 26a locally becomes faster, and the generation of air bubbles and the collapse of cavitation may occur.

According to the vibration-damping device 10 of this embodiment, when the liquid L flows out from the main body flow passage 25 to the primary liquid chamber 14 through the plurality of fine holes 26a, since the liquid L flows through each of the fine holes 26a while the pressure loss is caused by the first barrier 28 with the fine holes 26a formed therein, it is possible to suppress an increase in the flow velocity of the liquid L flowing through the respective fine holes 26a. In addition, since the liquid L flows through the plurality of fine holes 26a instead of a single fine hole 26a, it is possible to allow the liquid L to flow by branching into a plurality of streams, and it is possible to reduce the liquid L passing through the individual fine holes 26a. Therefore, it is possible to suppress a difference in the flow velocity occurring between the liquid L flowing into the primary liquid chamber 14 through the fine hole 26a and the liquid L in the primary liquid chamber 14 to small, and it is possible to suppress the occurrence of a vortex due to the difference in flow velocity, and the occurrence of air bubbles due to the vortex.

Furthermore, the ratio of the projected area or the opening area of the smallest cross section of each of the fine holes 26a, which occupies per a predetermined area on the inner circumferential surface facing the primary liquid chamber 14 among the first barriers 28, gradually decreases as it separates from the second communicating portion 27 in the flow passage direction R. Accordingly, when the liquid L flowing in the restriction passage 24 reaches the first communicating portion 26 from the second communicating portion 27, it is possible to suppress the liquid from passing through the fine hole 26a located on the second communicating portion 27 side in the flow passage direction R among the plurality of fine holes 26a to the first communicating portion 26 side by the inertial force. This also makes it easier for the liquid L to flow out from the fine holes 26a located on the second communicating portion 27 side and makes the flow velocity of the liquid L flowing out from the respective fine holes 26a uniform such that a locally high speed is curbed, and thus it is possible to more effectively curb generation of air bubbles and generation of abnormal sound caused by cavitation collapse.

In addition, as the plurality of fine holes 26a are located apart as it separates from the second communicating portion 27 in the flow passage direction R, the projected area or the opening area of the smallest cross section decreases. Therefore, it is possible to reliably achieve a structure in which the ratio of the projected area or the opening area of the smallest cross section of each fine hole 26a, which occupies per a predetermined area on the inner circumferential surface of the first barrier 28 facing the primary liquid chamber 14, gradually decreases as it separates from the second communicating portion 27 in the flow passage direction R, with a simple configuration.

In addition, among the plurality of fine holes 26a, the flow passage length of the fine hole located farthest as it separates from the second communicating portion 27 in the flow passage direction R is the longest. Accordingly, it is possible to increase the pressure loss of the liquid L flowing through the fine holes 26a located on the first communicating portion 26 side in the flow passage direction R among the plurality of fine holes 26a. Therefore, it is possible to prevent a large amount of liquid from flowing out at high speed from the fine hole 26a located on the first communicating portion 26 side in the flow passage direction R among the plurality of fine holes 26a.

Further, since the flow passage area of the main body flow passage 25 in the connecting portion 25a with the first communicating portion 26 gradually decreases as it separates from the second communicating portion 27 in the flow passage direction R, the flow resistance gradually increases in the process in which the liquid L flows through the connecting portion 25a, and the flow velocity of the liquid L is suppressed. This prevents the liquid L from passing through the fine holes 26a located on the second communicating portion 27 side in the flow passage direction R by inertia and easily allows the liquid to flow out also from the fine holes 26a on the second communicating portion 27 side. Thus, it is possible to reliably suppress a large amount of liquid L from flowing out at high speed from the fine hole 26a located on the first communicating portion 26 side in the flow passage direction R.

Second Embodiment

Next, a second embodiment of the present invention will be described, but the basic configuration is the same as that of the first embodiment. For this reason, the similar configurations are denoted by the same reference numerals, the explanation thereof will not be provided, and only differences will be described.

In the present embodiment, a circumferential interval in which the plurality of fine holes 26a are disposed is different.

Figure 3:
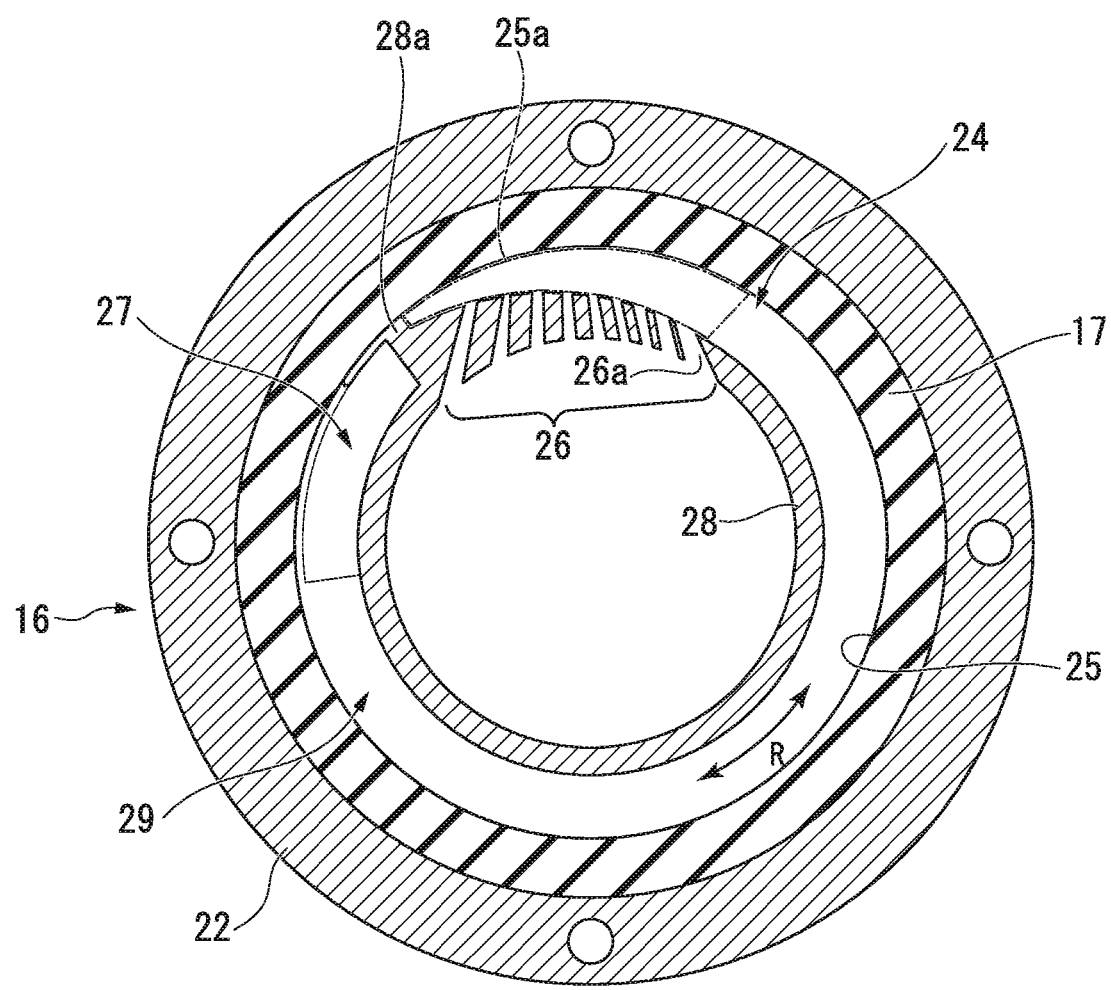
FIG. 3 is a cross-sectional view of the partition member and the elastic body according to a second embodiment.

As illustrated in FIG. 3, the circumferential interval in which the plurality of fine holes 26a in the present embodiment are disposed is not uniform. Specifically, the interval between the adjacent fine holes 26a in the flow passage direction R is gradually widened from the second communicating portion in the flow passage direction R.

According to the present embodiment, the interval between the adjacent fine holes 26a in the flow passage direction R is gradually widened from the second communicating portion in the flow passage direction R. Thus, it is possible to reliably achieve a configuration in which the ratio of the projected area or the opening area of the smallest cross section of each small hole 26a, which occupies per a predetermined area on the inner circumferential surface of the first barrier 28 facing the primary liquid chamber 14, gradually decreases as it separates from the second communicating portion 27 in the flow passage direction R, with a simple configuration.

It should be noted that the technical scope of the present invention is not limited to the above-described embodiments, and various modifications can be made within the scope that does not depart from the spirit of the present invention.

For example, in the above embodiment, the first communicating portion 26 includes a plurality of fine holes 26a, but the present invention is not limited thereto. For example, the second communicating portion 27 may have a plurality of fine holes arranged in the flow passage direction R. In this case, the ratio of the projected area or the opening area of the smallest cross section of the fine holes, which occupy per a predetermined area of the lower surface of the second barrier 29 facing the auxiliary fluid chamber 15, may gradually decrease from the first communicating portion 26 in the flow passage direction R. In this case, the plurality of fine holes may penetrate through the second barrier 29 in the axial direction. Further, in this case, as the plurality of fine holes 26 are located apart from the first communicating portion 26 in the flow passage direction R, the projected area or the opening area of the smallest cross section may decrease. Further, in this case, as the plurality of fine holes are located away from the first communicating portion 26 in the flow passage direction R, the flow passage length thereof may become longer. Further, in this case, the interval between the adjacent fine holes in the flow passage direction R may be gradually widened from the first communicating portion in the flow passage direction R. Further, in this case, the plurality of fine holes 26a may not be formed in the first communicating portion 26.

Further, in the above embodiment, the flow passage area of the main body flow passage 25 in the connecting portion 25a with the first communicating portion 26 gradually decreases as it separates from the second communicating portion 27 in the flow passage direction R. However, the flow passage area of the main body flow passage 25 in the connecting portion with the second communicating portion 27 may gradually decrease from the first communicating portion 26 in the flow passage direction R.

Further, in order to gradually decrease the flow passage area of the connecting portion 25a in the main body flow passage 25 as it separates from the second communicating portion 27 in the flow passage direction R, for example, the partition member 16 may be formed so that the width of the main body flow passage 25 of the connecting portion 25a in the axial direction gradually decreases as it separates from the second communicating portion 27 in the flow passage direction R.

Further, in the above-described embodiment, the fine holes 26a are formed in a rectangular shape, but they may be formed in a cylindrical shape or a conical shape.

Further, in the above-described embodiment, the flow passage cross-sectional area of the fine hole 26a is the same over the entire length of the flow passage length, but the fine holes 26a in which the flow passage cross-sectional area changes may be adopted.

Further, in the above embodiment, the plurality of fine holes 26a are disposed in the flow passage direction R, but the plurality of fine holes 26a may be disposed in the flow passage direction R and in the axial direction.

Further, in the above embodiment, the main body flow passage 25 is disposed to extend in the circumferential direction, but the present invention is not limited thereto.

Further, in the above embodiment, the partition member 16 is disposed at the lower end portion of the first attachment member 11, and the lower flange portion 22 of the partition member 16 is brought into close contact with the lower end surface of the first attachment member 11. However, for example, by disposing the partition member 16 sufficiently above the lower end surface of the first attachment member 11, and by disposing the diaphragm 20 on the lower side of the partition member 16, that is, at the lower end portion of the first attachment member 11, the auxiliary liquid chamber 15 may be formed from the lower end portion of the first attachment member 11 to the bottom surface of the diaphragm 20.

Further, in the above embodiment, the compression type vibration-damping device 10 in which the positive pressure acts on the primary fluid chamber 14 by the application of the support load has been described. However, the vibration-damping device is also be applicable to a hanging type vibration-damping device in which the primary fluid chamber 14 is attached to be located on the lower side in the vertical direction, the auxiliary liquid chamber 15 is attached to be located on the upper side in the vertical direction and a negative pressure is applied to the primary liquid chamber 14 by the application of the support load.

Further, in the above embodiment, the partition member 16 divides the liquid chamber 19 in the first attachment member 11 into the primary liquid chamber 14 having the elastic body 13 on a part of the wall surface and the auxiliary liquid chamber 15, but the embodiment is not limited thereto. For example, a pair of elastic bodies 13 may be provided in the axial direction instead of providing the diaphragm 20, and a pressure-receiving liquid chamber having the elastic body 13 in a part of the wall surface may be provided instead of providing the auxiliary liquid chamber 15. For example, the partition member 16 partitions the liquid chamber 19 in the first attachment member 11, in which the liquid L is sealed, into the first liquid chamber 14 and the second liquid chamber 15, and at least one of both liquid chambers of the first liquid chamber 14 and the second liquid chamber 15 can be appropriately changed to another configuration having the elastic body 13 in a part of the wall surface.

Further, the vibration-damping device 10 according to the present invention is also applicable to other than the engine mount, without being limited to the engine mount of the vehicle. For example, the vibration-damping device 10 is also applicable to mount of a generator mounted on a construction machine or is also applicable to a mount of a machine installed in a factory or the like.

According to the vibration-damping device of the present invention, at the time of vibration input, both attachment members are displaced relative to each other, while elastically deforming the elastic body, and the liquid pressure of the first liquid chamber fluctuates, such that the liquid flows between the first liquid chamber and the second liquid chamber through the restriction passage. At this time, after the liquid flows into the main body flow passage through one of the first communicating portion and the second communicating portion, the liquid flows out from the main body flow passage through the other of the first communicating portion and the second communicating portion.

Here, in a case in which a large load (vibration) is input to the vibration-damping device, when liquid flows out from the main body flow passage through the plurality of fine holes provided in the first communicating portion or the second communicating portion, since the liquid flows through each fine hole, while causing a pressure loss by the first barrier or the second barrier in which the fine holes are formed, the flow velocity of the liquid flowing through each fine hole can be suppressed. Moreover, since the liquid flows through a plurality of fine holes rather than a single fine hole, it is possible to allow the liquid to circulate by branching into a plurality of streams, and to reduce the flow velocity of the liquid having passed through the individual fine holes. Therefore, it is possible to suppress a difference in the flow velocity occurring between the liquid flowing into the first liquid chamber or the second liquid chamber through the fine holes and the liquid in the first liquid chamber or the second liquid chamber to be small, and it is possible to suppress the occurrence of a vortex due to the flow velocity difference and the occurrence of air bubbles due to the vortex.

Furthermore, the ratio of the projected area or the opening area of the smallest cross section of each of the fine holes, which occupies per a predetermined area in the first barrier or the second barrier, gradually decreases as one of the first communicating portion and the second communicating portion is separated from the other in the flow passage direction. Accordingly, when the liquid flowing in the restriction passage reaches one of the first communicating portion and the second communicating portion, it is possible to suppress the liquid from passing through the fine hole located on the other side in the flow passage direction among the plurality of fine holes by inertia. This also makes it easier for the liquid to flow out from the fine holes located on the other side and makes the flow velocity of the liquid flowing out from the respective fine holes uniform to suppresses the locally high speed, and it is possible to more effectively suppress the occurrence of air bubbles and the occurrence of abnormal sound caused by cavitation collapse.

Here, as one of the first communicating portion and the second communicating portion is separated from the other in the flow passage direction, the projected area or the opening area of the smallest cross section of the plurality of fine holes may be small.

In this case, it is possible to reliably achieve a structure in which the ratio of the projected area or the opening area of the smallest cross section of each of the fine holes, which occupies per a predetermined area in the first barrier or the second barrier, gradually decreases as one of the first communicating portion and the second communicating portion is separated from the other in the flow passage direction, with a simple configuration.

The interval between the fine holes adjacent to each other in the flow passage direction may gradually become wider as one of the first communicating portion and the second communicating portion is separated from the other in the flow passage direction.

In this case, it is possible to reliably achieve a structure in which the ratio of the projected area or the opening area of the smallest cross section of each of the fine holes, which occupies per a predetermined area in the first barrier or the second barrier, gradually decreases as one of the first communicating portion and the second communicating portion is separated from the other in the flow passage direction, with a simple configuration.

In addition, within the scope that does not depart from the spirit of the present invention, it is possible to replace the constituent elements in the above embodiment with known constituent elements as appropriate, and the above-described modified examples may be appropriately combined.

INDUSTRIAL APPLICABILITY

According to the present invention, it is possible to provide a vibration-damping device capable of suppressing the occurrence of abnormal noise due to cavitation collapse with a simple structure, without deteriorating vibration-damping characteristics.

REFERENCE SIGNS LIST

10 Vibration-damping device
11 First attachment member
12 Second attachment member
13 Elastic body
14 Primary liquid chamber (first liquid chamber)
15 Auxiliary fluid chamber (second liquid chamber)
16 Partition member
19 Liquid chamber
24 Restriction passage
25 Main body flow passage
25a Connecting portion
26 First communicating portion
27 Second communicating portion
28 First barrier
29 Second barrier
31 First opening portion (opening portion)
L Liquid

The invention claimed is:
1. A liquid-sealed type vibration-damping device, comprising:
a tubular first attachment member connected to one of a vibration occurrence part and a vibration reception part, and a second attachment member connected to the other;
an elastic body which elastically connects both attachment members; and
a partition member which partitions a liquid chamber in the first attachment member in which liquid is sealed into a primary liquid chamber and an auxiliary liquid chamber,
a restriction passage through which the primary liquid chamber and the auxiliary liquid chamber communicate with each other being formed in the partition member,
wherein the restriction passage includes a first communicating portion which is formed on a first barrier facing the primary liquid chamber and opens to the primary liquid chamber, a second communicating portion which is formed on a second barrier facing the auxiliary liquid chamber and opens to the auxiliary liquid chamber, and a main body flow passage through which the first communicating portion and the second communicating portion communicate with each other,
the first communicating portion includes a plurality of fine holes which penetrate through the first barrier or the second barrier and are disposed in a flow passage direction of the main body flow passage, and
a ratio of a projected area or an opening area of a smallest cross section of the plurality of fine holes, which occupies per a predetermined area of the first barrier or the second barrier, gradually decreases as the projected area or opening area separates from the second communicating portion to the first communicating portion in the flow passage direction.

2. The vibration-damping device according to claim 1, wherein the projected area or the opening area of the smallest cross section of the plurality of fine holes decreases, as the plurality of fine holes are located apart as the projected area or opening area separates from the other of the first communicating portion and the second communicating portion in the flow passage direction.

3. The vibration-damping device according to claim 2, wherein an interval between the fine holes adjacent to each other in the flow passage direction gradually widens, as the interval separates from the other of the first communicating portion and the second communicating portion in the flow passage direction.

4. The vibration-damping device according to claim 1, wherein an interval between the fine holes adjacent to each other in the flow passage direction gradually widens, as the interval separates from the other of the first communicating portion and the second communicating portion in the flow passage direction.

5. The vibration-damping device according to claim 1, wherein the plurality of fine holes are disposed in a portion of the first barrier that forms an end portion on one side of the main body flow passage in the circumferential direction.

6. The vibration-damping device according to claim 1, wherein the second communicating portion is disposed in a portion of the second barrier that forms the other end portion of the main body flow passage in the circumferential direction.

7. The vibration-damping device according to claim 1, wherein the primary liquid chamber is a space surrounded by the elastic body, a rubber film which liquid-tightly covers an inner circumferential surface of the first attachment member and the partition member; and wherein the auxiliary liquid chamber is a space surrounded by a diaphragm and the partition member.

8. The vibration-damping device according to claim 1, wherein the flow passage area of the first communicating portion gradually decreases in the direction of the main body flow passage from the second communicating portion to the first communicating portion.

9. The vibration-damping device according to claim 1, wherein the primary liquid chamber is a space surrounded by the elastic body, a rubber film which liquid-tightly covers an inner circumferential surface of the first attachment member and the partition member;
wherein the auxiliary liquid chamber is a space surrounded by a diaphragm and the partition member; and
wherein the flow passage area of the first communicating portion gradually decreases in the direction of the main body flow passage from the second communicating portion to the first communicating portion.

10. The vibration-damping device according to claim 9, wherein the main body flow passage connects with the primary liquid chamber only through the plurality of fine holes provided in the first communicating portion; and
wherein the main body flow passage connects with the auxiliary liquid chamber only through a single opening provided in the second communicating portion.

11. The vibration-damping device according to claim 1, wherein the second communicating portion includes a single opening that penetrates the second barrier.

12. The vibration-damping device according to claim 1, wherein the primary liquid chamber is a space surrounded by the elastic body, a rubber film which liquid-tightly covers an inner circumferential surface of the first attachment member and the partition member;
wherein the auxiliary liquid chamber is a space surrounded by a diaphragm and the partition member;
wherein the flow passage area of the first communicating portion gradually decreases in the direction of the main body flow passage from the second communicating portion to the first communicating portion;
wherein the main body flow passage connects with the primary liquid chamber only through the plurality of fine holes provided in the first communicating portion; and
wherein the main body flow passage connects with the auxiliary liquid chamber only through a single opening provided in the second communicating portion.

* * * * *